US006669564B1

(12) United States Patent
Young et al.

(10) Patent No.: US 6,669,564 B1
(45) Date of Patent: Dec. 30, 2003

(54) EPISODIC DELIVERY OF CONTENT

(75) Inventors: Neil C. Young, San Francisco, CA (US); Richard E. Moore, San Jose, CA (US)

(73) Assignee: Electronic Arts Inc., Redwood City, CA (US)

( * ) Notice: Subject to any disclaimer, the term of this patent is extended or adjusted under 35 U.S.C. 154(b) by 66 days.

(21) Appl. No.: 09/605,070

(22) Filed: Jun. 27, 2000

(51) Int. Cl.[7] .................................................. A63F 9/24
(52) U.S. Cl. ....................................................... 463/42
(58) Field of Search ............................... 463/9, 30, 36, 463/29, 40–42; 725/1, 9, 25, 30, 63–64, 86–87, 135, 141; 434/307 R, 308, 322, 323; 345/473; 273/429–432

(56) References Cited

U.S. PATENT DOCUMENTS

| 5,051,822 A | * | 9/1991 | Rhoades |
| 5,267,734 A | * | 12/1993 | Stamper et al. |
| 5,659,793 A | * | 8/1997 | Escobar |
| 5,678,571 A | * | 10/1997 | Brown |
| 5,679,075 A | * | 10/1997 | Forrest et al. |
| 5,942,969 A | * | 8/1999 | Wicks |
| 6,102,406 A | * | 8/2000 | Miles |

OTHER PUBLICATIONS

Ultima Online information from UO dot com, showing periodic updates, changes or patches to game since Nov. 16, 1999, 29 pages.*

Information from gamespot dot com describing history of star wars video games since 1982.*

* cited by examiner

Primary Examiner—Mark Sager
(74) Attorney, Agent, or Firm—Gerald T. Gray; Townsend and Townsend and Crew LLP

(57) ABSTRACT

A system, method, and apparatus are provided that allow episodic delivery of entertainment content to a user. More specifically, an application module is created with episodic content technology, which can be purchased as a CD-ROM or downloaded from a remote server. The application module contains a current episode of the game and a technology shell to allow future episodes to be downloaded and executed. The entertainment content delivery system is implemented through a centralized server that provides new episodes of the content available for downloading at regularly scheduled intervals to the users' computers. The current instantiation of the application module segregates technology components from content components of the application module to allow independent modification of either. Technological advancements are incorporated as they occur into the new episodes and are executed by the application module. An Internet-enabled game using the entertainment content delivery system communicates with users through various mechanisms, including e-mail, voice mail, fax machines, web sites, and the like.

11 Claims, 6 Drawing Sheets

EPISODIC DELIVERY OF CONTENT

BACKGROUND

1. Field of Invention

The present invention relates generally to computer entertainment content delivery; specifically, a system in which entertainment content is delivered episodically over a network.

2. Background of the Invention

Currently, computer entertainment ("games") are distributed to users as complete individual packages. For example, if a user would like to play a new game offered by an entertainment company, the user typically buys a CD-ROM or downloads a file(s) and data. The game provides a complete content or theme in which the game takes place. For example, if a user wants to play Myst™, the user purchases the Myst™ CD-ROM and plays through the game, as fast as the user is able or desires. Then, when the user wants to play a sequel to Myst™, the user waits for the makers of Myst™ to produce a sequel, typically 18 months after the release of the initial version of the game. The user then purchases the CD-ROM sequel and plays it as before. The games are typically produced by the entertainment company using the latest technology available at the time of development of the application. Using the latest technology is an important marketing tool for application developers, as users prefer realistic and immersive gaming environments. However, due to the rapid pace of technological development, upon release, a game may already be using out-of-date technology. For example, during the development period of a game, technological advancements may occur multiple times. However, these later advancements cannot be included in the end product because the developer must fix the technology used to implement the game during development. Thus, the entertainment company is continually offering an application module that does not provide the most current technology, and generally fails to include technological developments occurring during the development of the game.

Additionally, the conventional method of entertainment content delivery ineffectively builds a mass following because users may purchase the game and become involved in different parts of the gaming experience at different times. Thus, a significant portion of users may have completed the game while many other users have just begun, and thus these groups are segregated based on their different time-based experiences of the game. The conventional method also fails to provide current gaming experiences for those games in which current events play a role in the gaming experience. In the conventional entertainment content delivery scheme, the content is fixed at the time of delivery, and cannot be updated until a new version or sequel of the game is developed, typically 18 months later. As with technological developments, current events occurring during the development of a game may not be able to be used, because of the need to fix the content during development. Additionally, the static nature of conventional content delivery systems cannot take advantage of new technology, such as the Internet for providing new types of gaming experiences.

Thus, a new method of delivering entertainment content is needed in which technological changes can be incorporated into application modules as the changes occur, in which a broad following of users can be developed through providing a common time-based gaming experience, and in which current events can be integrated into the content of the application module. Further, a new method of delivering content is needed which can take advantage of new technologies for communication with a user to provide new types of gaming experiences.

SUMMARY OF INVENTION

The present invention provides for episodic delivery of entertainment content. More specifically, in one embodiment, an application module for a game or other form of entertainment content is created with episodic content technology, which can be purchased as a CD-ROM or downloaded from a remote server. In one embodiment, the application module contains a current version of the game and modular component technology to allow future episodes to be downloaded and executed. In a preferred embodiment, an entertainment content delivery system is implemented through a centralized server that maintains content that is made available to users at periodic intervals, for example, monthly. Thus, by providing a game in a plurality of episodes, each episode can comprise the latest technology then available. Therefore, in accordance with the present invention, technological improvements can be delivered to the public as they occur.

For example, if the game is a conspiracy role-playing game in which users must uncover clues and solve a mystery, the first-obtained version of the application module contains the data to support a current episode of the game and the latest technology to implement the game. Then, at periodic intervals, a new episode is made available to users, and the users can play a new episode as the new episodes become available. Each of these new episodes contains the latest available technology and/or content. In a preferred embodiment, the period for delivery is monthly, and therefore any technological improvements can be delivered to the public within months after the technological improvements occur. In contrast, in conventional systems, technological improvements cannot be easily implemented into a game until years after the improvements occur.

In accordance with the present invention, the current instantiation of the application module segregates technology components from content components of the application module to allow later developed technology to be seamlessly applied to previously created episodes. Also, as the stages of the game are enabled only in an episodic format, all users can experience the current stage simultaneously, thus creating the potential for a mass following of a game through the generation of simultaneously experienced game situations.

A further benefit of the present invention is that as games are episodically delivered, an initial episode only requires implementation of a portion of the overall storyline and thus the time to market is very short. In contrast, in conventional systems, an entire complex storyline must be developed and perfected prior to initial release of the game. Additionally, the technology implementing the entire storyline must be implemented and debugged. Thus, the time to market for a product manufactured using conventional processes is much longer than the time to market for an initial episode of content as generated by the present invention.

A preferred embodiment of the present invention uses the Internet as the medium for delivering the episodic content. Accordingly, various new mechanisms for delivering a gaming experience are also provided in accordance with the present invention. In one embodiment, a user preferably provides or is provided an e-mail address, a voice mailbox, and/or a facsimile number and various other content transport mechanisms such as web sites, hot mail, and pagers, with which the content deliverer can communicate with the user. Then, information related to the game is provided to the user through these various mediums as part of an episode or during the interval between episodes. These new methods greatly enhance the gaming experience of a user. For example, in a preferred embodiment, a character in an episode can leave voice-mail messages to a user relating some information relevant to the game, for example, a clue to a mystery posed by the game. E-mails and facsimiles may also be used to relay information from within the game to users of the game. Thus, the episodic nature of the present invention enables new types of transport mechanisms to be used to deliver the entertainment content to provide new types of gaming experiences.

In a further embodiment, the pace of play is managed from a centralized server to ensure the communal gaming experience is as simultaneous as possible. For example, although monthly installments of the game may be made available, episodic content such as clues required to proceed to a next stage may be made available only on a conditional basis. The conditions may be predicated on a user accomplishing a task, for example, discovering a certain web site, or may be time based, to ensure that all players reach the same points in the game at approximately the same time. Finally, current events can be integrated into the game due to its episodic delivery and modular component technology, thus providing a more realistic and entertaining gaming experience. For example, for a conspiracy game, an actual current event of nuclear secret espionage with a foreign state can be integrated into the game, even if the application module was first delivered prior to the events occurring or being known to the public. If the current event is part of the back story, the current event can be incorporated in the next installment of the game, thus providing a real-time feel to the gaming experience. In one embodiment, a news story is placed on a web site and the link information is transferred to the users through one of the means described above. In a further embodiment, third party web sites having content related to the entertainment content are used to host the episodic content, and the application developer can place the clues at a third party site and thus direct web traffic to the third party in exchange for some monetary or other benefit. Thus, the present invention provides delivery of episodic content of a game, resulting in a shorter time to market, increased responsiveness to technological change, a communal user experience, and flexibility to incorporate current events.

DETAILED DESCRIPTION OF PREFERRED EMBODIMENTS

Figure 1A:
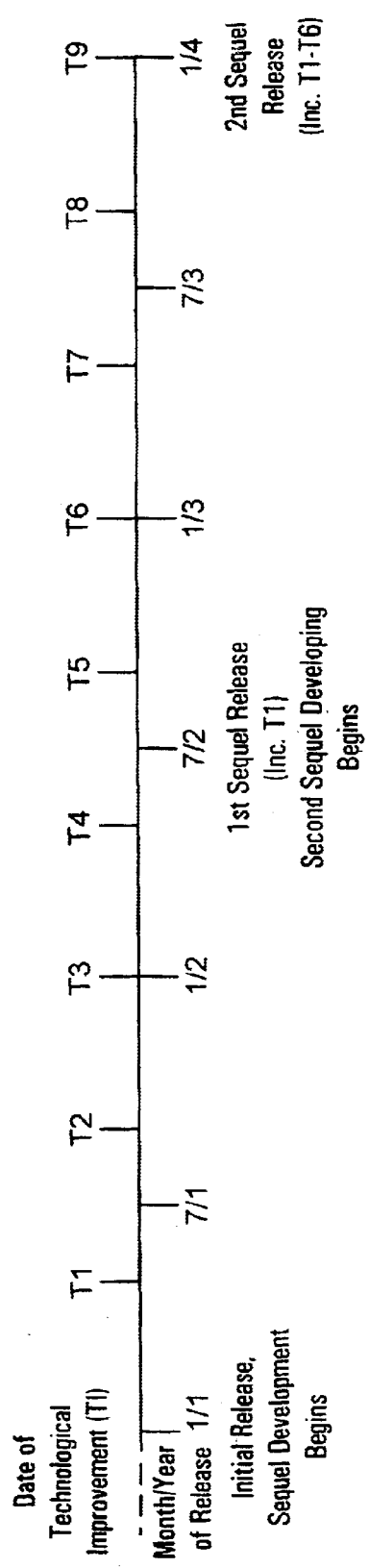
FIG. 1a is an illustration of timeline for prior art content delivery.

Referring to FIG. 1a, a conventional production development cycle for an application module is shown. Application module as used herein refers generally to an electronic game, but can apply to any time of computer software that can be modularized and episodically delivered. The timeline illustrates the occurrence of technological improvements (T1-9) every four months, a normal rate of technological advance. The timeline also illustrates the release of an initial product at month 1, year 1, a first sequel at month 7, year 2, and a second sequel at month 1, year 4, in accordance with a traditional eighteen-month development cycle. In conventional production systems, the first six months of a cycle are used to develop a storyline for a product and develop the technological platform with which the storyline is to be implemented. After the first six months, the technology for the product is typically fixed. The remainder of the cycle is used for further refinement of the story and debugging the finished game product. Therefore, the first sequel to an application module can only incorporate technological improvements occurring within the first six months of the development cycle. Technological improvements are advances in the state of the art as related to rendering, displaying, storing, and transmitting application modules, as well as, in accordance with the present invention, new media access technology. Such improvements include new graphics technology, new video or audio compression technology, new web content delivery technology, new 3D rendering schemes, new web-enabled communication devices, optimizing existing technology for improvements in processing speed and memory capabilities.

In accordance with the present invention, episodes are preferably delivered episodically over the Internet. Episodes may be delivered, i.e., transferred to a user's computer, or they may be made available, i.e., located on a central server and access to the episode permitted, in accordance with the present invention. In this embodiment, new media access technology can also be utilized in future episodes. For example, a current episode may require a user to download JPEG files to view documents that are part of the content of the application module. However, an application developer may want to take advantage of newer document representation technology, such as the Adobe Acrobat Reader™, and therefore supply this technology to the use in a future episode. The use of new media access technology is also considered to be a technological improvement. However, as shown in FIG. I a, the conventional systems are unable to provide technological improvements to users close in time to when the technological improvements are available to the application developers.

For example, in the conventional system the first sequel released eighteen months after the initial product's release, incorporates only Technological Improvement 1 (T1), because only T1 occurred within the initial six-month development period. T2–T4 occurred too late to be included in the first sequel. The second sequel, released another 18 months later, incorporates only T1-6. Thus, there is a significant lag between when a technological improvement occurs and when the technological improvement can be incorporated into the application module and then released to the public. For example, T2 occurs in month 9 of year 1, and is not incorporated until the 3$^{rd}$ sequel in month 1, year 4, twenty-nine months after the technological improvement occurs. If the electronic game is reality-based, current events also cannot be incorporated in a timely fashion in a conventional entertainment content delivery system. If a major event occurs in month 10, year 1, it will not be incorporated into a product using conventional development cycles until month 1, year 4, twenty-four months after its occurrence.

Figure 1B:
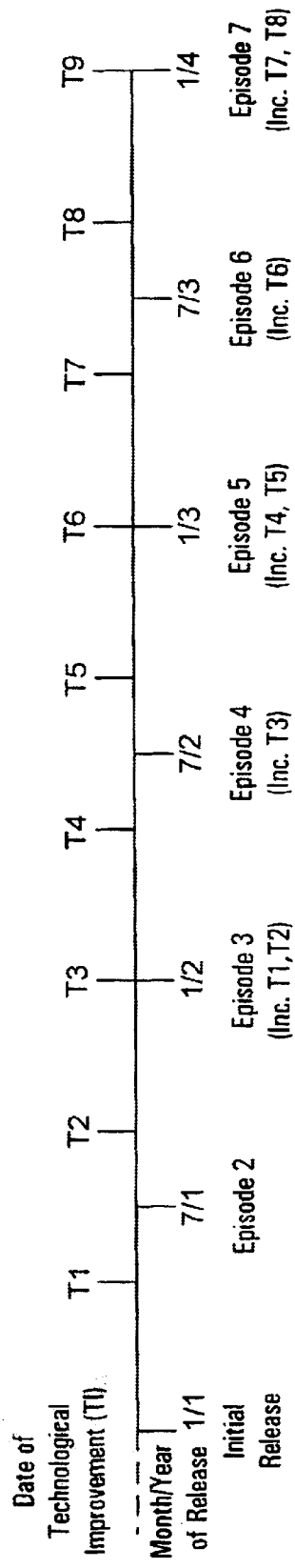
FIG. 1b is an illustration of a timeline for semi-annual episodic content delivery.

FIG. 1b illustrates a timeline of an application module delivery system in accordance with the present invention.

The initial version of an application module having episodic content technology is made available in month 1, year 1. This initial version supports content for only an initial episode. Thus, the initial version of the application module can be delivered to market much more quickly than competitor's products using conventional systems because only a portion of the storyline must be implemented. Subsequent application modules having subsequent episodes are made available every six months, in this exemplary embodiment. The interval for making episodes available can vary in accordance with the present invention, depending on the complexity of the episodes. However, the intervals should be limited in time to provide the advantages discussed herein. As can be seen, this shortened development cycle allows for technological improvements to be delivered to the public closer in time to when the technological improvements occur. For example, in Episode 3, released in month 1, year 2, T1 and T2 are already incorporated. In conventional systems, as shown in FIG. 1*a*, T1 is not delivered to the public until month 6, year 2. Table 1 below illustrates in more detail the differences in the time to market for technological improvements.

TABLE 1

| Delivery Schedule | Difference Between Time When Technological Improvement is Released to Public using Conventional System and Episodic System (In Months) | | | | | |
| --- | --- | --- | --- | --- | --- | --- |
|  | T1 | T2 | T3 | T4 | T5 | T6 |
| Episodic (six-monthly) | 6 | 24 | 18 | 12 | 12 | 6 |
| Episodic (monthly) | 12 | 25 | 22 | 18 | 13 | 10 |

As can be seen, in the six-month episodic system, T1 is released 6 months ahead of when it would be released to the public using the conventional system. T2 is released two years ahead, T4 and T5 are released one year ahead, and so on. This is a significant difference in the time to market for technological improvements. Thus, the popularity of a product implemented in accordance with the present invention will be greatly increased because the product will contain technological advances that other competing products will not contain for a year or more after the product is released.

Similar to the conventional cycle, the first month of a production interval in accordance with the present invention is used to refine the storyline and generate the technology to implement the story. Therefore, technological improvements can be incorporated if they occur within the first month of the interval. Thus, Episode 4, released month 7, year 2, incorporates T1-3. As shown in FIG. 1*b*, by the time Episode 7 is released, T1-7 are incorporated into the application module, providing a more sophisticated gaming experience than a competitor's product using a conventional production cycle.

Figure 1C:
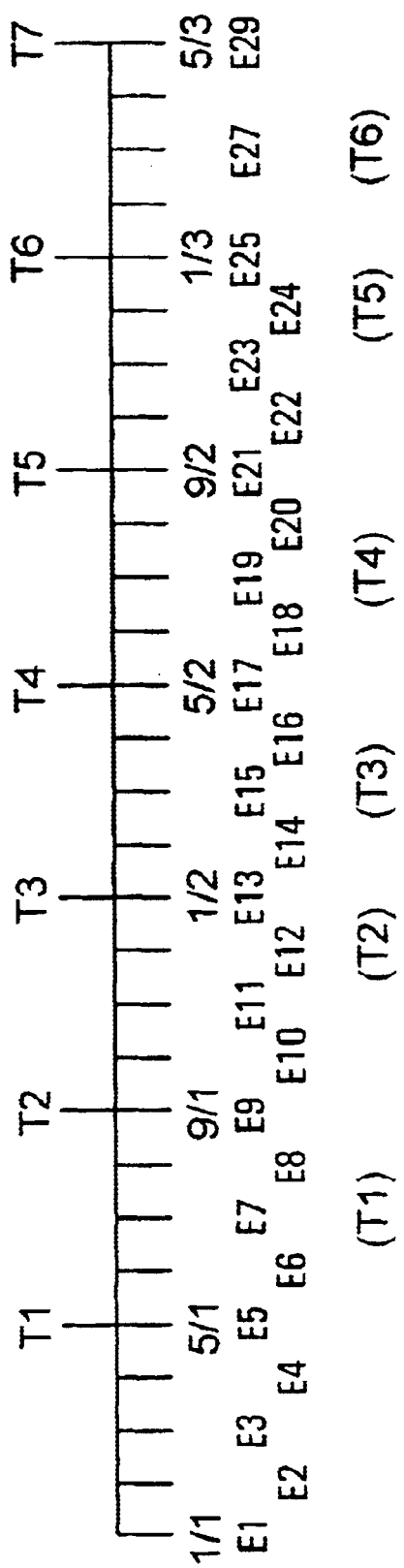
FIG. 1c is an illustration of a timeline for monthly episodic content delivery.

A preferred production cycle is shown in FIG. 1*c*, in which episodes are generated and made available on a monthly basis. Although episodes could be generated and made available in a single monthly cycle, in order to provide a buffer in the event of an episode being delayed, three episodes are initially produced and stored prior to the first episode being delivered to a user. Thereafter, episodes are generated each month, but are released with a two-month delay. Thus, problems arising in the generation of an individual episode can be solved without unduly impacting the delivery scheduled. As can be seen in FIG. 1*c*, this monthly delivery cycle having an initial buffer enables similar improved incorporation of technological improvements. The timeline illustrates the release times of each episode. If a three-episode buffer is built in, then episode 4 is being developed when episode 1 is released. Therefore, T1 is incorporated into Episode 8 as it is being developed (at episode 5's release date), and is available to the public in month 8, year 1. T2 is incorporated into Episode 12, and is therefore available to the public in month 12, year 1. Thus, as shown in Table 1, this delivery cycle also provides a faster time-to-market for technological improvements than a conventional production cycle. T1 is released 12 months ahead of when it would be released using the conventional system, T2 is released 25 months ahead, and T3 is released 22 months ahead. Of course, if the monthly delivery schedule is interrupted by a hiatus (e.g., vacations for application developer team), the schedule is delayed, but even if a six-month hiatus is taken after 9 episodes, upon the return all of the technological improvements occurring during the hiatus can be incorporated into the first episode after the release, still providing a faster time to market for a technological change in comparison to conventional systems.

Figure 2:
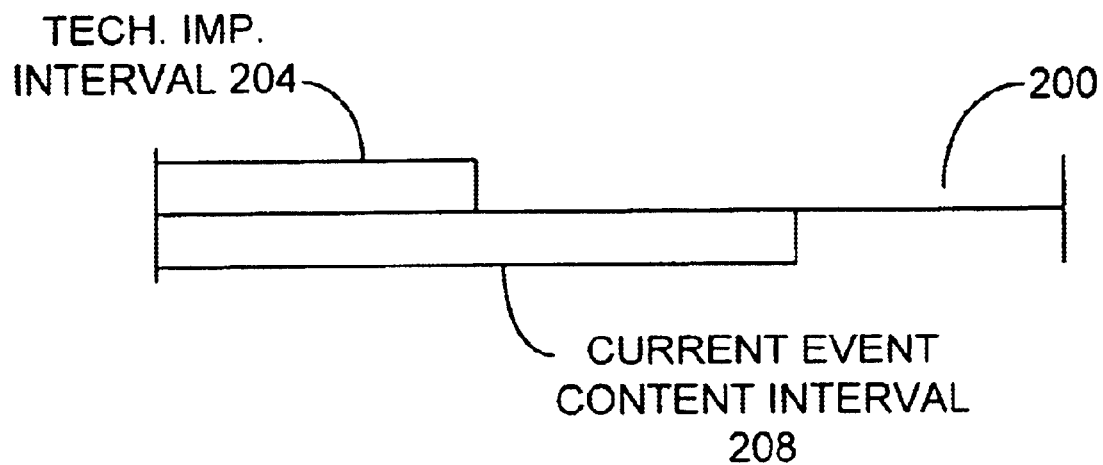
FIG. 2 is a diagram of a production interval.

FIG. 2 illustrates a production interval 200 in more detail. As shown, in an interval 200 of a certain time period, the first portion is a technological improvement portion 204 of the interval 200, and it is within this interval that new technology can be incorporated into the episode under development in the interval. After a certain period of time, the technology available to be used to implement an episode becomes fixed, and later technological improvements cannot be incorporated until the next interval 206. Additionally, for reality-based games, current events can also be incorporated in a current event content interval 208 as shown in FIG. 2. In accordance with the present invention, content is implemented in a separate content module, and the technology for implementing the content is implemented in a separate module. This allows the content to be independently modifiable of the technology, and allows the content to be modified later than the technology. As shown in FIG. 2, the current event content interval extends much further into the cycle than the technological improvement interval 208. Thus, episodes can appear to be very current upon their release because late-breaking current events can be incorporated into an episode even if the technology for incorporating the episode is fixed. Typically, if the current event is related to the back story of a game, the current event can be quickly worked in to the next installment, by a character reference or through posting a link to news story describing the event on a website as discussed below. If the current event is to be incorporated into the plot, the event may not be incorporated for several installments, as the plot is being rewritten to accommodate the event.

Figure 3:
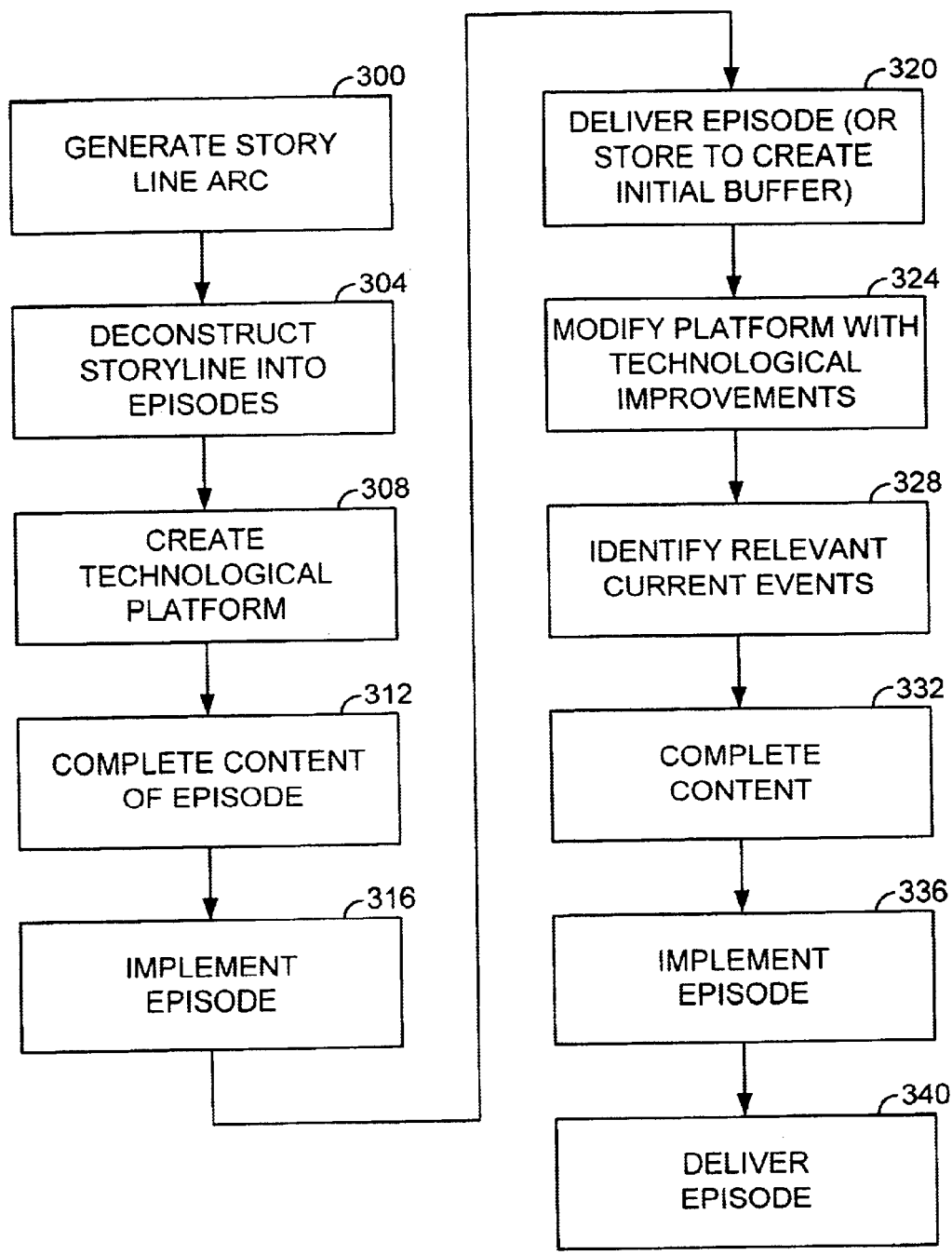
FIG. 3 is a flow chart of generating episodic content.

FIG. 3 is a flowchart illustrating an embodiment of a method for generating episodic content in accordance with the present invention. First, in this embodiment, a storyline are for the application is generated 300. The storyline are comprises the overall or substantial portion of the plot of the application, and can include creation of recurring characters that appear in most episodes. The storyline are generation is typically performed in conventional methods of creating application content as well. However, in accordance with the present invention, the storyline is deconstructed 304 into smaller segments. The segments may correspond to episodes, or the segments may be larger pieces of the storyline. In this embodiment, the larger pieces themselves are later segmented into episodes. By dividing the storyline into segments larger than an episode, the application developer is freer to modify and alter individual episodes based on current events or new ideas, and still meet the overall direction of the story. Also, by segmenting the original storyline into larger pieces, the work of determining precisely what content belongs in a specific episode is dispersed over the individual intervals, thus shortening the time to market for the initial episode.

Additionally, the episodic nature of the content delivery allows the application developer to alter the storyline are after the initial delivery transparent to the user. Thus, if the current storyline does not appear to be attracting interest, the application developer can transparently alter the storyline are on the fly, and deconstruct the new storyline into new segments and new episodes to the user. In contrast, in conventional systems, if a storyline is not attractive to users, the application developer cannot alter the application module, and the application module may suffer from poor sales. Recurring characters are also typically created in the initial stages of the creating a storyline, and these characters may be implemented in as many different segments as required. However, due to the episodic nature of the content creation, new characters can be created to interact with the recurring characters on an episodic basis. The new characters can recur with greater frequency if there is popular interest in a new character, thus driving up sales of future episodes. Further, the ability to add new characters allows the application developer to alter the storyline easily during the life of the application. Although the method has been described as deconstructing an already existing storyline are, the present invention can also be implemented by creating the episodes serially in time without requiring deconstruction of an existing storyline. In this embodiment, episodes or segments are created initially in an episodic format, and either are designed to carry out a storyline are or, in some cases, may not carry out any overall storyline are but may be individual stories connected only by recurring characters.

After the storyline has been deconstructed, or initial segments have been generated, a technological platform for implementing a first episode is created 308. The technological platform is the technology required to implement the content of the story. Typically, the technological platform will include the code for generating an animated or otherwise represented world and characters that interact in that world, the interface to user computers, and other technology used to implement games for computer systems. In accordance with the present invention, the technological platform is implemented separately from the content, to allow modification of the technological platform without requiring modification to the content, and vice versa. In one embodiment, the initial technology used to implement the storyline uses commercially available technology using, for example, ShockWave (™) Flash technology from MacroMedia, RealAudio/RealVideo (™) technology from RealMedia, and other similar technologies. These technologies are chosen in part, as discussed in more detail below, because the preferred embodiment of the present invention utilizes Internet technologies, media, and content as a part of the gaming experience. Thus, in this embodiment, the technology platform comprises the latest or custom versions of these technologies from the third party vendors supplying the technology.

Next, the content for the first episode is completed 312. This typically entails specific storyboarding of the action to take place in the first episode, the dialogue, and a determination of which characters are present in the first episode. If larger segments were deconstructed from the storyline are, then at this point the amount of the story to be related in the first episode must be determined. After the content is complete, the content is implemented 316 using the technology of the technological platform to create the complete first episode. Then, the first episode is delivered 320 or is made available to the users. As discussed above, the time to market for the delivery of the initial episode is much shorter than in conventional systems as only the details of the initial episode are required to be finalized, implemented, and debugged. In contrast, in conventional systems, the entire storyline must be finalized, implemented, and debugged, which takes a much longer period of time.

In one embodiment, as discussed above, a predefined number of episodes are stored at the server as a buffer prior to delivering the first episode. The buffer period provides more flexibility in the schedule for delivering episodes, in the event that a problem arises during the generation of an episode. For example, if a system has a buffer period of three months (monthly delivery with three months of episodes pre-stored), and an important content developer becomes ill, delivery of the next episode is not in jeopardy. Of course, the time required to generate the episode under development is shortened, but the impact of the delay is spread out over the buffer period.

After the first episode is delivered, the application developer modifies 324 the technological platform with any technological improvements that have occurred. As discussed above, these improvements include advancements in 3D rendering techniques, the ability to take advantage of faster user terminals, and any other advancement in computer technology relevant to the application module. The improvements may be developed internally, or may require the incorporation of improvements made by the third-party vendors supplying the technology. In one embodiment, to minimize the time required to transfer new technology to the user, technological improvements are transferred to the user incrementally. For example, if an application developer is aware of a new media technology that will be useful in a current episode under development, the files required to install the new technology can be attached to the episodes that have not yet been transferred to the users. Thus, if a production schedule is three episodes ahead (a typical schedule), and if the files required to execute the new technology comprise 21 Mb, 7 Mb can be attached to each of the three episodes that are to be delivered prior to the episode using the improvement. Thus, the transfer time of the new technology can be minimized responsive to the episodic delivery of the present invention. In contrast, in conventional systems, if a game is downloaded, the user downloads the entire file, which may take an extremely long time and may be unsuccessful because of the amount of time required for the transfer, due to connection breaks and the like.

At the same time, in one embodiment, any current events relevant to the storyline are identified 328 for inclusion into the storyline are. As discussed above, this allows the application module to be contemporary with changing events. For example, if a war is initiated between two countries in the real world, this event can easily be incorporated into the next episode. This ability to include current events enhances the gaming experience for users, in contrast to conventional systems which could not include the current event until years after it occurs.

Next, the content for the next episode is completed 332, including any current events deemed relevant, and the next episode is implemented 336 using the current technological platform. Then, the new episode is delivered 340 or stored for later delivery. Thus, the new episode can incorporate the latest technological improvements, the latest in current events, and therefore provide a richer experience for the user then applications modules producing using conventional systems. Moreover, application modules having the latest technology and current events have a significant marketing advantage over competing products that do not. Although the above methodology has been described as occurring in a specific order, the order is exemplary and is not intended to be a limitation on the present invention.

Figure 4:
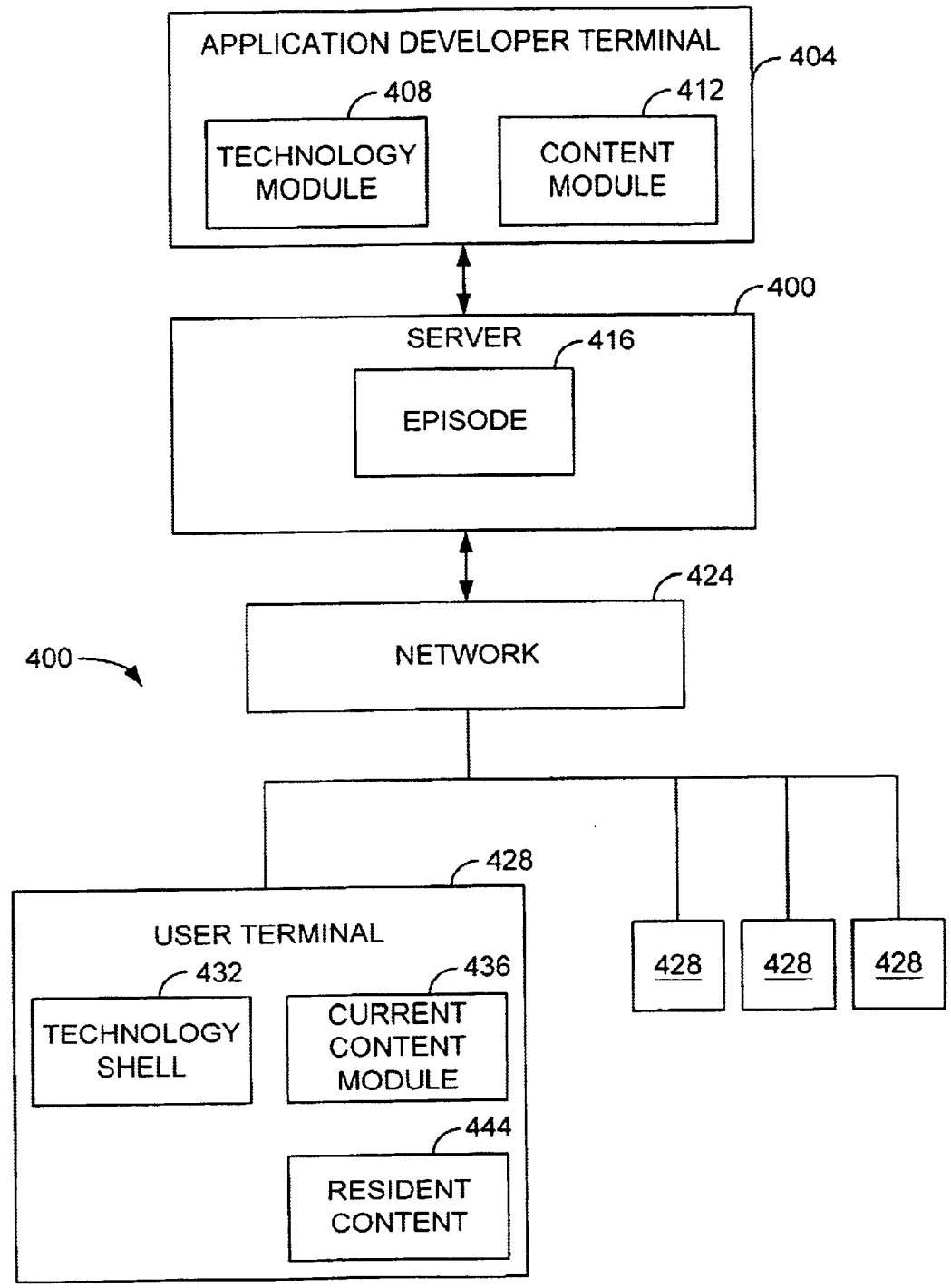
FIG. 4 is a block diagram of a system for delivering episodic content.

FIG. 4 is a block diagram of an application module delivery system 440 in accordance with the present invention for delivering episodic entertainment content to at least one user. A plurality of user terminals 428 are coupled to a network 424, which may be the Internet, or any other network of connected computing devices. User terminals are personal computers, or any other processing device capable of processing and displaying for view computer-implemented content. An application-developer server 400 is coupled to the network 424, and an application developer terminal 404 is coupled to the server 400. The application developer server 400 may use a dedicated server or may use a shared server in accordance with the present invention.

The application developer generates episodic application modules 416 ("episodes") on the application developer terminal(s) 404 and stores the episodes 416 on the server 400. The episodes 416 may include only the content module 412 of the current episode 416, or may include technological improvements, which are preferably stored as a separate technology module 408 on the server 400 for transfer to the user. The application developer terminal 404 is illustrated as a single terminal in FIG. 4, but is typically implemented as a network of computers upon which teams of application developers may work together. As discussed above, the episodes 416 are logically composed of a technology module 408 and a content module 412. While in progress, the content module 412 and the technology module 408 of an episode 416 in production are developed by the teams of application developers assigned to their production. Upon completion, the content is then implemented and tested using the technology of the technology module 408 and the finished episode 416, comprising the two modules 408, 412, is stored on the server 400. If the technology has not been altered since the last episode, the content is developed to take advantage of the previously delivered technology, but no extra technological components are required to be generated and delivered in accordance with the present invention. Thus, only content files are transferred in this situation. As technological improvements occur only periodically, this system minimizes the size of most episodes to be delivered to user's terminals 428. In contrast, in conventional systems, technology is always delivered regardless of whether the user already has the technology, thus wasting valuable user resources.

In one embodiment, users access the episodes from their user terminals 428 through the network 424. In a preferred embodiment, the server 400 is a restricted access server, and users gain access to the episodes 416 only upon payment of a fee, one-time, monthly, or the like. Upon accessing the server 400, the current episode 416 and, optionally, previously released episodes 416, are available to the user. The user can then download the episode 416 and play the episode 416 on the user's terminal 428. Upon completion of the episode 416, the user must wait until the next interval 200 before obtaining the new episode 416. In an alternate embodiment, the application modules are transmitted to the user's terminals 428. This may occur as a regularly scheduled delivery (for example, if the user has subscribed to the application developer's service), or the current episode 416 may be delivered upon request at any time during the interval 200.

In an embodiment in which episodes 416 are delivered upon a request, users access the server 400 through an Internet connection, and may be required to submit a user ID and password. In this embodiment, server 400 verifies the password and the user ID and allows the user to access the current episode 416. In one embodiment, only current episodes 416 are permitted to be accessed. An access window is generated by the application developer to specify a period of time within which users may access the current episode 416. After the access window for an episode 416 has expired, the episode 416 can no longer be accessed by the user. The access window may be generated by creating an authorization program for each episode 416 that is dependent upon the date and time access is requested. Therefore, the application developer can require users to play an episode 416 at approximately the same time frame by allowing access or scheduling delivery during the access windows. A further benefit in this embodiment to the application developer is that by limiting access to users of only current episode 416 during a limited access window, the economic value of past episodes 416 is enhanced. Additionally, in accordance with the present invention, the access window can be used to ensure that multiple users are playing the same episode 416 at the same time. This shared entertainment experience is one of the advantages of the application module delivery system of the present invention as users enjoy playing in an environment in which they know that multiple other users are also experiencing the same entertainment in approximately the same time frame. Additionally, as the users are playing the entertainment at the same time, they can converse with each other about game strategy and the like. For example, if a mystery game is developed in accordance with the present invention, and the interval 200 is a month, then each month users will access the new episode 416, play the new episode 416, and will be able to discuss their common experiences during the interval prior to the new episode's release. However, in a conventional format, a game is released once at a certain time, and users can begin play at any time. There is no common experience; and in the more typical scenario, many people have completed the game in its entirety before many others have begun the game. This lessens the shared gaming experience, which many users enjoy.

As discussed above, in accordance with the present invention, the application modules of the present invention are delivered episodically. One issue with providing application modules episodically is the preferable capability of allowing users who did not participate in previous episodes 416 to join and participate fully in on-going episodes 416. In a preferred embodiment, the first episode 416 of an application module purchased by a user, either through transfer from a server 400 or as a CD-ROM or other data storage device, contains a technological shell 432 (as shown in FIG. 4) to provide resident technology required for enabling the playback of the episodes. The technological shell 432 is provided regardless if it is the first episode 416 of an application module or a later episode 416 that is "first" for the specific user. The technological shell 432 is the platform that is updated during the life of the product as technological improvements arise. For example, if a third-party media player serves as the basis for episode playback, the initial episode 416 obtained by the user will have the entire set of files required to implement the latest version of the third-party media player being used by the application developer. A full set of the technology updates required to view the latest episode 416 is also stored on the user's terminal to enable the viewing and playing of the content of the current episode 416. The combination of the latest updates and the resident technology is maintained on the user's terminal 428 as the technological shell 432. In one embodiment, the technology is maintained as a system tray application to provide ease of use and of updating. In one embodiment, the technological shell is maintained on a separate server 400, and the users access the centralized server 400 to play the episodes. In this embodiment, the user terminals 428 are not required to store the episodes 416 or shell 432, but need only access the server through a web browser, or the like, to access the episodes 416.

In addition, in one embodiment, a resident content module 444 is also provided with the initial episode obtained by the user. This resident content module 444 is preferably a background story that all users must experience prior to joining in an ongoing episodic delivery system. The background story preferably provides an explanation of the story and an introduction to characters and an explanation of the episodic content delivery system. In one embodiment, an initial episode may provide a summary of the content that has been relayed to the users to this point. Alternatively, the first version purchased does not provide a recap of previously delivered episodes, but those episodes are made available for the user to purchase and play separately.

In contrast to conventional systems, subsequent deliveries of episodes 416 are smaller than the initial version, as the technological module 408 of the new application modules need comprise only that code that is new and must replace existing code to implement the new technological improvements to enable the current content. As discussed above, existing technology that has not been affected by the improvements can be left unaltered, thus minimizing the size of subsequent application modules. To determine whether a user requires a first version or a subsequent version of an application module, in an embodiment in which the user accesses the server 400 for the new episode, the server 400 can query the user's terminal 428 to determine the version, if any, of the episode 416 stored on the user's terminal 428. If the episode 416 is current, then the server 400 transfers the next episode with only the new technological improvements occurring since the last episode 416. If the episode 416 stored is not the latest episode 416, or if the user does not have a previous episode 416 at all, the server 400 transfers or makes available a full installment of files to upgrade the user's terminal 428 to the current level of technology. Thus, by modularizing the content from the technology, the improvements to the technology can be made seamlessly, and only as required for an individual user. In contrast, in conventional systems for delivering entertainment content, each new sequel transfers an entire set of technology, even if it is redundant to technology used in the previous application.

In a further embodiment, the episodes 416 are developed using episodic content echnology that allows the previous episodes 416 to be upgraded to the current level of echnology. In this embodiment, the technology and content are still modularized, and when the technology for later episodes changes, the technology modules 408 of the previous episodes 416 are replaced with the latest version of the technology. Thus, in contrast to conventional systems, earlier episodes 416 can be played or experienced using the most current technology, allowing earlier episodes 416 to appear seamlessly integrated with the later episodes 416.

One advantage of using Internet-based platform to execute the application module of the present invention is that the third-party technology is self-updating. Thus, if an application developer chooses to use the commercially available ShockWave platform from MacroMedia, Inc., as MacroMedia updates ShockWave, MacroMedia provides the updates for users. In many cases, the user is notified directly by the ShockWave web site when an update is available, and either automatically updates or provides an option to be updated to the user. These advances are transparent to the application developer, whose content will now be enriched by the third party's technological improvements without having to devote any resources to incorporating the technological improvement. Thus, by using the system of the present invention, applications can improve technologically through the efforts of third-party entities, without the involvement of an application developer.

Another advantage of the episodic delivery of the present invention is that large files can be delivered piecemeal. As described above, large technology improvements can be delivered in parts during several episodes. However, in accordance with the present invention, video and audio files are also a part of the gaming experience. These files are typically large and require a great deal of time to download. In accordance with the present invention, these files are also downloaded incrementally during prior episodes to minimize the impact of the transfer of data to the user. In an alternate embodiment, a background downloader is maintained on the server 400. The background downloader transfers data to the user terminals 428 whenever the user is online. A typical downloader is commercially available, for example, from Marimba, Inc. Thus, by employing the episodic delivery via the Internet in accordance with the present invention, background downloading can be used to provide seamless and transparent transfer of data to the user. For example, if a 20 Mb video file of a mock-presidential debate is part of a future episode, the video is placed on the server 400 in advance to allow its transfer in the background to all of the users that subscribe to the service. Then, when the episode 416 that incorporates this video is delivered to the user, the video is already present on the user's terminal 428.

The episodic and Internet aspects of the present invention provide for a unique and rich entertainment experience not possible with conventional systems. In one embodiment, the content comprising the episodes 416 to be delivered to the users are constructed as independent units to be delivered to the user through various transport mechanisms, allowing the game experience to be integrated into the user's life. The delivery of episodic content in independent segments through the transport mechanisms provides a realistic dimension not found in conventional gaming technology. For example, the application may send episodic content as part of an episode 416 such as an e-mail message from a villain character and to the user that states "I would advise you to stop poking around in matters that you don't understand." The user may receive this message through various transport mechanisms at work, home, or a special account maintained for the game. Additionally, the episodic content may comprise voice mail messages left from characters in the episodes that further the plot or atmosphere of the game. For example, a voice mail message may be from a character requesting "You must call 1-800-555-5555 to learn more!". The user will then dial this number from any telephone and discover the clue. Moreover, the application may direct the user to different web sites, some of which are maintained by the application developer and some that are independent, to search for clues relating to the game. A special web interface is developed in one embodiment that allows the users to access the web in the conventional fashion, but if the users are playing the game, structure the user's web interaction around the game. (For example, if a user uses the search engine provided to search for a non-game item, the search results will be generated in the traditional fashion.) However, if they search on the name of a character in the game, for example, the search engine will retrieve actual search results as well as game-generated search results. The game-generated search results leads the users to more episodic content. Thus, in accordance with the present invention, the gaming technology of the present invention provides an immersive, realistic, and ubiquitous gaming experience through the delivery of episodic content over various transport mechanisms.

Figure 5:
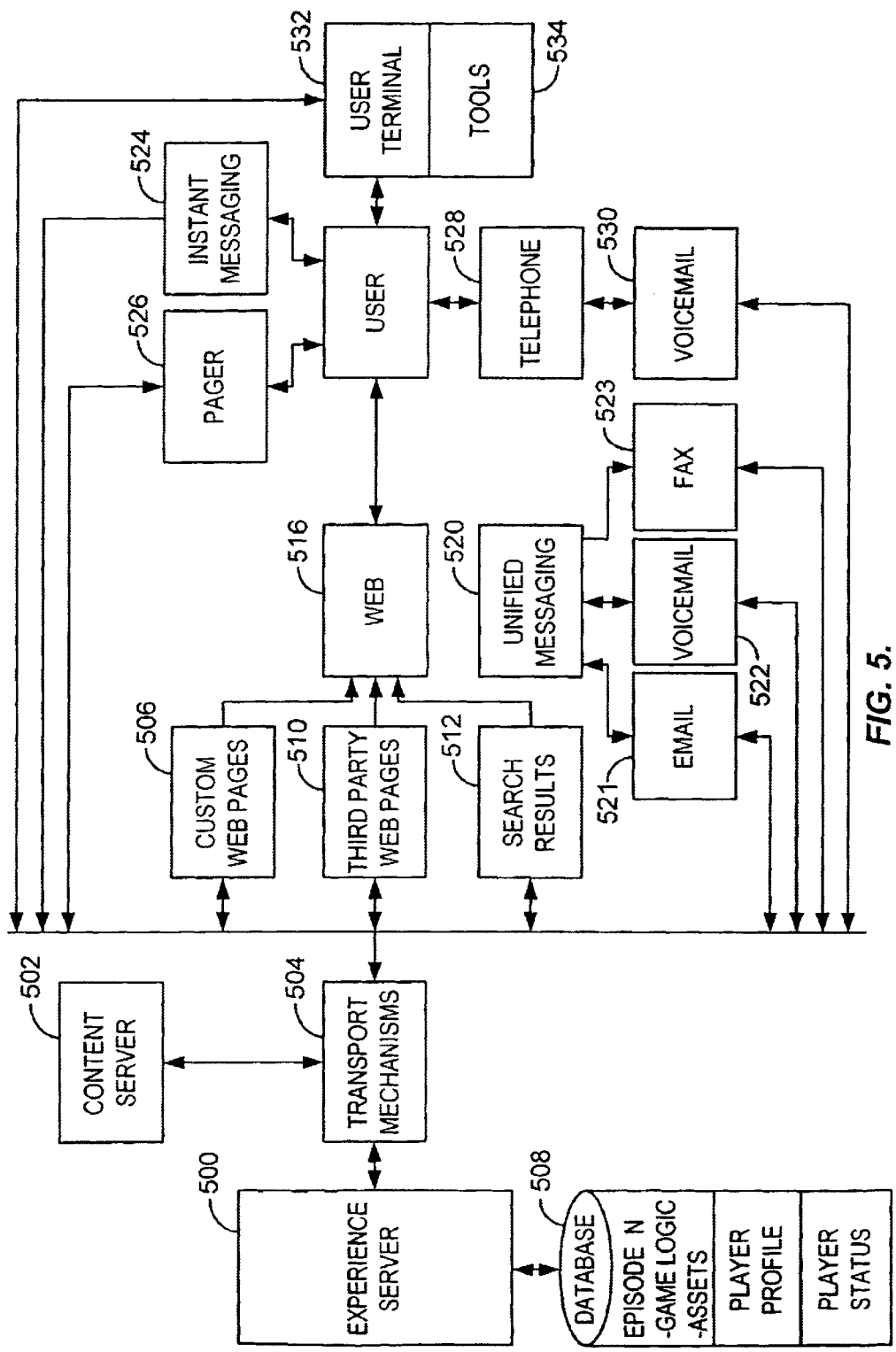
FIG. 5 is a block diagram of a server and associated infrastructure for delivering episodic content.

As shown in FIG. 5, one system in accordance with the present invention preferably incorporates several different methods of communication and types of episodic content. Although FIG. 5 lists a plurality of types of interactions, all or none of these may be used in connection with the present invention. First, FIG. 5 illustrates an experience server 500 that serves as the focal point for the implementation of the web-based gaming technology of the present invention. The experience server 500 is a UNIX™ or similar server as is known in the art. The experience server 500 is coupled to a database 508. The database 508 is preferably a SQL™ or other similar database structure. The database 508 maintains information on each episode, a player profile field for each player, and a player status field for each player. The episode information includes the game logic as well as the episodic content for the episode. The game logic are the instructions that control the game operation. The asset information is information regarding different assets stored on the content server 502. Assets are different multimedia content objects in accordance with the present invention, for example, e-mail or voice mail messages, or video or audio clips, PDF files, or the like. The content server 502 is a conventional server that maintains the assets for retrieval and delivery. The asset information, in one embodiment, identifies the asset related to particular episode and an associated transport mechanism. Then, the experience server 500 can use the asset information to retrieve the asset from the content server 502. Alternatively, the experience server 500 can use the asset identification to instruct the content server 502 to deliver the identified asset across the appropriate transport mechanism 504.

An episode 416 itself in this embodiment is a set of different program modules or actions that are triggered based on user actions. For example, if a user enters a name of a character into a search engine, and selects the correct link from the list of search results 512, the user will access the associated web page. At the same time, the user terminal 532 transmits a message to the experience server 500 notifying the experience server 500 that the user has reached the correct web page. If the experience server 500 itself is serving the web page, the user terminal 532 does not have to notify the experience server 500, as the user's selection of the link itself serves as notification. The game logic of the experience server 500 in this example then determines the next action to take, for example, the delivery of some episodic content to the user to further the plot of the episode 416 responsive to the user having selected the correct link.

For example, reaching the web site may require the experience server 500 to send an e-mail message to the user terminal 532. The e-mail message preferably further develops the storyline that the web page is presenting. For example, the web page may be a news site that has a story describing CIA experiments on killer bees, and referencing a Professor Brown who is an expert in the field. The subsequent e-mail message may then be delivered from "Professor Brown". Thus, the user receives the e-mail message from Professor Brown only after the user has learned about Professor Brown in the news story. Thus, the experience server 500 of the present invention is able to control game play in a conditional manner, allowing users to experience new parts of the game in real time as they achieve certain goals. The status of a player is maintained in the player status field of the database 508. This enables the experience server 500 to prevent the user from accessing parts of the game that are not intended to be available to the user until certain criteria are met. For example, if the user had not been aware of Professor Brown from playing the game, but typed in "Professor Brown" into a game search engine (if, for example, a friend told him about Professor Brown), the experience server checks the player status field to determine if the user had reached the killer bee news story web site. If the user had not reached the site, the user is provided with ordinary search results retrieved from the web. If the user had reached the web site, special search results related to the game's Professor Brown (for example, a curriculum vital) may be returned in response to the search.

In accordance with one embodiment of the present invention, an episode is a group of related conditional actions. After the final condition is met and the last action of an episode is made available to the user, the episode 416 is complete. The next episode 416 is then available for play at the next release point of the application developer. For example, if the episodes 416 are to be made available monthly, the first action of each episode 416 will occur each month, assuming that the last condition of the previous episode 416 has been met by the user. In one embodiment, if a user joins a game after several episodes 416 have been made available, the user can play the original episodes 416 at his own pace until the user has caught up. Then, the user can access episodes 416 as they become available. In a monthly subscription fee model, the condition for delivery of the first action of the next episode 416 is whether payment has been received for the episode 416. Payment information is also maintained in the player status field. Thus, the experience server 500 will check the player status field to determine whether a user has paid for an episode 416 prior to making the episode available. In one embodiment, if a user has not paid, then at the time the next episode 416 is available, the experience server 500 sends an e-mail notifying the user that the next episode 416 is available upon payment.

The experience server 500 communicates with the user through a variety of different methods. Various transport mechanisms 504 are coupled to the experience server 500 to provide the ability to transmit and receive content to and from the user through unified messaging applications 520. Unified messaging applications are any known technology that can be used to communicate with a user. For example, in a preferred embodiment, a user is either provided an e-mail address 521 or the experience server 500 stores an existing e-mail address of the user in the player profile field. Then, in this embodiment, one of the transport mechanisms 504 is an e-mail application program that can send and retrieve e-mails to remote users (for example, Outlook™). The experience server 500 may also have its own custom e-mail application. The messages can provide a task or puzzle to solve, new information relating to the content of the storyline, or can serve an administrative function for managing the game. To add to the realism of the game, the experience server 500 may send messages "from" characters within the game to the users. For example, an e-mail message may comprise clues to the game such as, "The secret identity of the saboteur is located at http:\\ XXX", or may be include a video file that has mysteriously "turned up" and should be viewed by the users.

In another embodiment, a voicemail program 522 is provided to the user. In this embodiment, the experience server 500 retrieves voice content from the content server 502 and delivers the voice content to the server that supports the voice mail program when appropriate. In one embodiment, the voice mail messaging is a provided by a third party entity that hosts a server for recording, storing, and delivering voice messages. In this embodiment, the transport mechanism is the telephone, ISDN, fiber optic, or the like connection between the experience server 500 and the voice mail server. Then, the voice mail server notifies the user that the user has received a message, for example, by sending an e-mail to the user, or posting a message on a web site hosted by the voice mail server, or the like. Then, the user will contact the voice mail server through the web 516 to retrieve the voice mail message. A voice mail system 530 connected to a user's telephone may also be used. In this embodiment, the user may be given a telephone number to call to discover a further clue. The telephone number is then associated with a conventional voicemail system 530 that can play a message back to the user. In this embodiment, the user communicates with the application using the user's telephone 528, providing more complexity to the game, i.e., characters from an episode can "leave" messages to the users of the game, creating a more realistic gaming experience. For example, a character may leave a message such as "I will be at XXX chat room tonight, meet me there." Then, the users will connect to that chat room on the third party site 510 to find out what the character has to say. A fax 523 service is also used in a preferred embodiment. In this embodiment, the transport mechanism is also a telephone or other connection to a server that maintains faxes. The experience server 500 maintains telephone numbers or user IDs in the player profile fields. Then, the experience server 500 then distributes the fax information to the fax server or directly to a user's fax machine. Fax machines 505, computer implemented or separate, can then be used to send paper documents to users as appropriate in the game. In this embodiment, for example, a character of the game may be the "boss" of the user characters, and in one episode the users may be terminated from their virtual job. In this example, a termination memorandum may be faxed to the users, providing a realistic touch to the gaming experience. This interactive and ongoing gameplay is a feature unique to a system employing the methodology of the present invention. In one embodiment, the application developer enables all three technologies for all of its users, by providing each user with an e-mail address, a fax number for their computer, and a voice-mail box.

Another method of delivering content to a user in accordance with the present invention is through the use of web sites, either third party web sites 510 or through application developer designed custom web pages 506. For example, a clue task for a game may be to discover a person's secret identity. The clue may indicate the web site or web sites to which the application developer had the identity information. The users of the game will then access the web site or web sites in order to discover the identity. If the web site is a third party site 510, in a preferred embodiment, the application developer can sell the web traffic to the site 510. This provides a reverse "targeted advertising" mechanism as the application developer can select web sites 510 whose content is related to the game, and therefore the users of the game will be self-selected consumers who already have an interest in the subject matter of the web site 510. Thus, the application developer can deliver a known amount of web traffic comprising consumers who are more likely to be interested in a web site than an average web surfer.

For example, if the game is a conspiracy theory game, the target web site 510 may be a subscription-based UFO portal site, that has a "free" area that the users can visit in order to find the answer to the clue task. While searching for the clue answers, the users may become independently interested in the UFO site. This type of targeted consumer matching is very valuable in industry and thus, the system of the present invention can provide alternate revenue streams for the application developer. In addition, the use of a third party web site 510 or web site 506 hosted by the application developer as part of a gaming experience provides a unique and attractive gaming experience not provided by conventional gaming applications. The entire web is available to the application developer to integrate into an application module, providing a rich tapestry from which the application developer can create a storyline. As most users of games are internet-familiar, those users enjoy surfing around the Web, and the experience of surfing the Webs part of a mission of the game will be enjoyable to them.

One particular example of the use of web sites 510 in accordance with the present invention is through the posting of news stories. News stories may be provided to a user at a news site 506 maintained by the application developer, or at a third party site 510 as discussed above. The news stories may be actual news stories that are related to the content of the storyline, or may be fabricated news stories. Fabricated news stories may either be completely fictional, in which case they are similar to the e-mail messages described above, or they may link actual news stories to the fictional events occurring in the application. For example, if an actual current event was the NASA loss of a Mars probe, the actual story could be posted on the news web site, if the application module related to space and conspiracy. An e-mail message may be sent to the users advising them to check the news site 510. In addition, a fabricated news story could be then be published at the site 510 that purports to link the loss of the probe to a report finding that the probe was deliberately sabotaged to prevent the public from finding out there are aliens on Mars. This allows application developers to take advantage of relevant current events as they occur, and not wait until they are incorporated into a future episode.

Another example of communicating through the use of the Web is through search engines that provide search results 512 customized for the game. For example, in one embodiment, a transport mechanism is an application-designed search engine that receives queries from a user. The search engine transmits the query to the centralized server 500 that then determines the results of the query based on the player status and the game content. As discussed above, if a condition to content is the user transmitting a specific search term, the experience server 500 will verify that the submitted term matches the required term, and then release the next block of content. In one embodiment, that block of content may include a search result 512 that is related to the story that will provide the user with information if the user selects the result 512. Other results are preferably delivered that are obtained from performing an ordinary search on the Web using either a custom search engine or a third party search engine. Thus, the search engine feature of the Web is integrated into the gaming experience of the present invention.

Another method of interacting with a user is through instant messaging 524 and pagers 526. Both of these devices allow instant communication with a user, adding a dynamic element to the game. For example, if the time is 6:30 p.m., a page message may state that the user must log online at 6:37 p.m. to view a live web broadcast. In this embodiment, the experience server 500 is coupled to a pager network, typically maintained by a third party such as SkyTel™, The player profile fields would store the user pager information, and responsive to the game logic determining that the user should be paged, the experience server retrieves the pager information and transmits a message (typically e-mail) to the pager network. The pager network then converts the e-mail message into a format compatible with the pager system, and delivers the message to the user.

Instant messaging can provide similar interaction; however, the messages can only be transmitted when the user is online. In this embodiment, for example, a pager message may request a user to log on to the Internet, and once logged on, the instant messaging system 524 can be used to interact with the user. For example, a character in the episode may conduct a "conversation" with the user. The character would typically send a limited number of pre-defined messages that further the plot or the atmosphere of the game as appropriate to the user's position in the game. In this embodiment, the experience server 500 is coupled to an instant messaging network 524 that can provide instant messages to the users. The experience server 500 stores the instant messaging address information in the player profiles. When the player status information and game logic indicate that an instant message should be sent, the experience server 500 can request that the user log onto the Internet (using voicemail, e-mail, pager, or the like), and then deliver the instant messages to the users.

In a preferred embodiment of the present invention, the experience server 500 provides tools 534 to the user that are part of the gaming experience. A tool 534 is any interactive digital object that the user can operate independent of the episode 416. These tools 534 are downloaded prior to enabling an episode 416 requiring a tool 534, and the user as required by the episode can then use the tool 534. For example, in one episode a secret password must be obtained by a user in order to access information in a later episode. However, the password is maintained in a "server" that is security protected. A "hacking" tool 534 is then provided to the user that simulates hacking into the server to obtain the password. Other tools 534 could include a simple decryptographer that can decrypt simple encrypted codes, or an MP3 player for playing MP3 files, including application-related MP3 files. In a Windows™ environment, the tools 534 may be stored as system tray applications that are maintained on the user's task bar to provide easy access when needed.

Thus, the present invention provides an improved delivery system for delivering application modules to a plurality of users, and provides new methods of interacting with a user to provide an entertaining and realistic gaming experience. It is to be understood that the specific mechanisms and techniques that have been described are merely illustrative of one application of the principles of the invention. Numerous additional modifications may be made to the apparatus described above without departing from the true spirit of the invention. Moreover, although specific functionality has been ascribed to different steps of the above described method and modules of the above described circuitry, these functionalities can be performed in different orders and by different modules as would be known to one of ordinary skill in the art.

What is claimed is:

1. A method of providing an Internet-enabled game, the method comprising:

receiving information regarding a user's current state in the game;

responsive to the current state, enabling episodic content to be accessed by the user;

receiving a search request from the user; and responsive to the current state of the user in the game, transmitting game-generated search results to the user.

2. The method of claim 1 wherein the search results are game-related responsive to the search request being game-related and the current state of the user indicating that the user is permitted to receive game-related search results.

3. The method of claim 1 wherein the search results are not game-related responsive to the current state of the user indicating that the user is not permitted to receive game-related search results responsive to the search term entered by the user.

4. The method of claim 1, wherein current state information comprises a notification from an application module resident on the user's terminal that the user has accessed a pre-specified web page.

5. The method of claim 1, wherein the current state information comprises a user action.

6. The method of claim 5 wherein the user action is calling a predefined telephone number.

7. The method of claim 5 wherein the user action is accessing a predetermined web site.

8. The method of claim 5 wherein the user action is requesting a specific search term.

9. The method of claim 1, wherein episodic content is stored within a third-party website that is content-related to the storyline, and the users are directed to the web-site to discover the episodic content.

10. The method of claim 9 wherein episodic content is placed on a third party web site for compensation related to user traffic to the web site related to users searching for the episodic content.

11. The method of claim 1, wherein an episode is made available responsive to determining whether the user has submitted payment, for the episode.

* * * * *